United States Patent [19]

Biller et al.

[11] 4,373,853

[45] Feb. 15, 1983

[54] LOG HANDLING MACHINE

[75] Inventors: Cleveland J. Biller; Benjamin C. Thorner, both of Morgantown, W. Va.

[73] Assignee: The United States of America as represented by the Secretary of Agriculture, Washington, D.C.

[21] Appl. No.: 171,625

[22] Filed: Jul. 23, 1980

[51] Int. Cl.[3] .......................... B66C 23/00; B60D 1/02

[52] U.S. Cl. ....................................... 414/732; 414/23; 414/686; 414/695.5; 414/738; 172/274; 212/246

[58] Field of Search .............. 414/23, 686, 694, 695.5, 414/695.6, 703, 731, 732, 733, 734, 735, 738, 745, 747, 607; 212/180, 181, 189, 231, 232, 237, 238, 242, 243, 246; 172/272, 274

[56] References Cited

U.S. PATENT DOCUMENTS

| | | | |
|---|---|---|---|
| 420,942 | 2/1890 | Kilgore | 212/238 X |
| 3,081,891 | 3/1963 | Przybylski | 172/274 |
| 3,154,199 | 10/1964 | Balogh et al. | 212/231 |
| 3,197,038 | 7/1965 | Billings | 212/246 |
| 3,207,044 | 9/1965 | Hall | 212/231 X |
| 3,709,390 | 1/1973 | Tanguay | 414/731 |
| 3,874,532 | 4/1975 | Metailler | 414/747 X |
| 4,034,998 | 7/1977 | Iijima et al. | 172/272 |
| 4,260,064 | 4/1981 | Ekstam | 212/231 |

*Primary Examiner*—Robert J. Spar
*Assistant Examiner*—Janice Krizek
*Attorney, Agent, or Firm*—M. Howard Silverstein; David G. McConnell

[57] ABSTRACT

A log handling attachment for a bulldozer or similar vehicle consisting of a bracket assembly arranged to be detachably mounted on the rear portion of the vehicle and carrying a horizontally rotatable articulated boom provided with hydraulic cylinders for moving the pivoted parts of the boom, and provided with a hydraulically-driven gear and sprocket chain system for swinging the boom around a vertical axis through a wide angular range. A hydraulic winch is mounted on the boom, having a long cable running through sheaves on the boom and provided with a log-engaging tool at the end of the cable. Operating power is derived from the power take-off shaft of the vehicle.

12 Claims, 7 Drawing Figures

LOG HANDLING MACHINE

FIELD OF THE INVENTION

This invention relates to timber harvesting apparatus, and more particularly to a swinging boom log skidding and loading attachment for a bulldozer or similar vehicle.

BACKGROUND OF THE INVENTION

Various types of hydraulic knuckle-boom log loaders have been proposed or made available on the market, and some of these have been provided with winch mechanisms with relatively short cables, so that they are limited to hauling logs for relatively short distances. Attention, for example, is invited to the following prior U.S. patents of interest which relate to devices for setting telephone poles, for pulling stumps or trees, or for bunching and falling trees, and which are not suitable for the hauling of logs considerable distances: U.S. Pat. Nos. Rowe 2,290,384; Klein 2,779,486; Carbert et al. 3,189,194; Scaperotta 3,333,717; Spanger 3,576,202; and Wirt 4,126,235.

No hydraulically powered swinging boom log hauling units have been made available for hauling logs through distances of 600 feet or more. Also, no such units have been available as attachments to crawler vehicles or bulldozers, employing the power available from such vehicles. There is a definite need for a swinging boom type of log hauling machine which can be furnished as an attachment for a bulldozer or similar vehicle and which includes a hydraulically powered winch with a long cable to enable the skidding of logs up hills and for considerable distances to loading positions where they can be bucked and loaded onto a truck.

SUMMARY OF THE INVENTION

The device* of the present invention is a hydraulically powered unit which is mounted on the rear portion of a conventional bulldozer and is supported thereon by a pair of large pins or bolts. The device is powered from the power take-off shaft and the hydraulic pump of the bulldozer. The device can be easily disconnected so that the bulldozer can be used in its normal manner.

*See "Harvesting on Rough Terrain with the Appalachian Thinner", distributed at the Richmond, Va. East Coast Sawmill and Logging Exposition, May 30, 1980.

The attachment has a knuckle-type boom which can be rotated through 360° and carries a hydraulic winch with 700 or more feet of $\frac{3}{8}$ inch cable. This cable extends over the boom through a set of sheave blocks and is provided at its end with a set of tongs. The tongs may be carried by a worker a substantial distance to a tree or log which has been cut, the tongs may then be attached to the tree or log, and then the tree or log may be bucked or loaded directly onto a truck. The 360° rotating boom allows for ease of loading logs and stockpiling logs. The attachment eliminates the need for a separate loader and a separate skidder on a logging operation, thereby minimizing the amount of capital investment required.

Accordingly, a main object of the invention is to provide a novel and improved rotating knuckle-type boom logging attachment for a bulldozer or similar vehicle which overcomes the shortcomings and disadvantages of the previously available rotating boom-type logging devices.

A further object of the invention is to provide an improved rotating-boom logging attachment for a bulldozer or similar vehicle, said attachment being easy to install on the vehicle, providing a long hauling range, and providing easy loading and stockpiling of logs.

A further object of the invention is to provide an improved swinging boom-type logging attachment for a bulldozer or similar vehicle, said attachment having a boom which is rotatable through a complete 360° revolution, which allows for ease of loading or stockpiling logs, which carries a heavy-duty hydraulic-powered winch, and which eliminates the need for a separate loader and a separate skidder on a logging operation.

A still further object of the invention is to provide an improved swinging boom-type logging attachment for a bulldozer or similar vehicle which carries a hydraulic-powered winch with a capacity of up to about 1500 feet of log hauling range, which has the capacity of performing most of the required tasks of a log harvesting process, including skidding the logs and loading them on a truck, and which can be readily disconnected from the associated vehicle so that said vehicle can be used in its normally intended manner.

A still further object of the invention is to provide an improved attachment to convert a bulldozer or similar vehicle into a mobile log skidding and log loading device by employing quick disconnect attachment means, which provides a single machine to perform all the functions previously obtained from three separate machines (bulldozer, skidder and loader), which has a 360° rotation capability, which has a folding boom to facilitate loading variable length logs onto a truck, which has a hydraulically powered winch which powers its cable both on and off its winch drum, facilitating outhaul of cable on steep slopes, which is very stable when skidding logs, thus requiring no guy lines, which has a winch located on the rear portion of its boom so that smooth winding of the cable on the winch drum is obtained, which has good stability when moving over uneven roads or rough terrain on its associated bulldozer or other vehicle, and which can skid logs successfully in both selection cut, as well as in clearcut, operations.

BRIEF DESCRIPTION OF THE DRAWINGS

Further objects and advantages of the invention will become apparent from the following description and claims, and from the accompanying drawings, wherein:

DETAILED DESCRIPTION OF A PREFERRED EMBODIMENT

Figure 1:
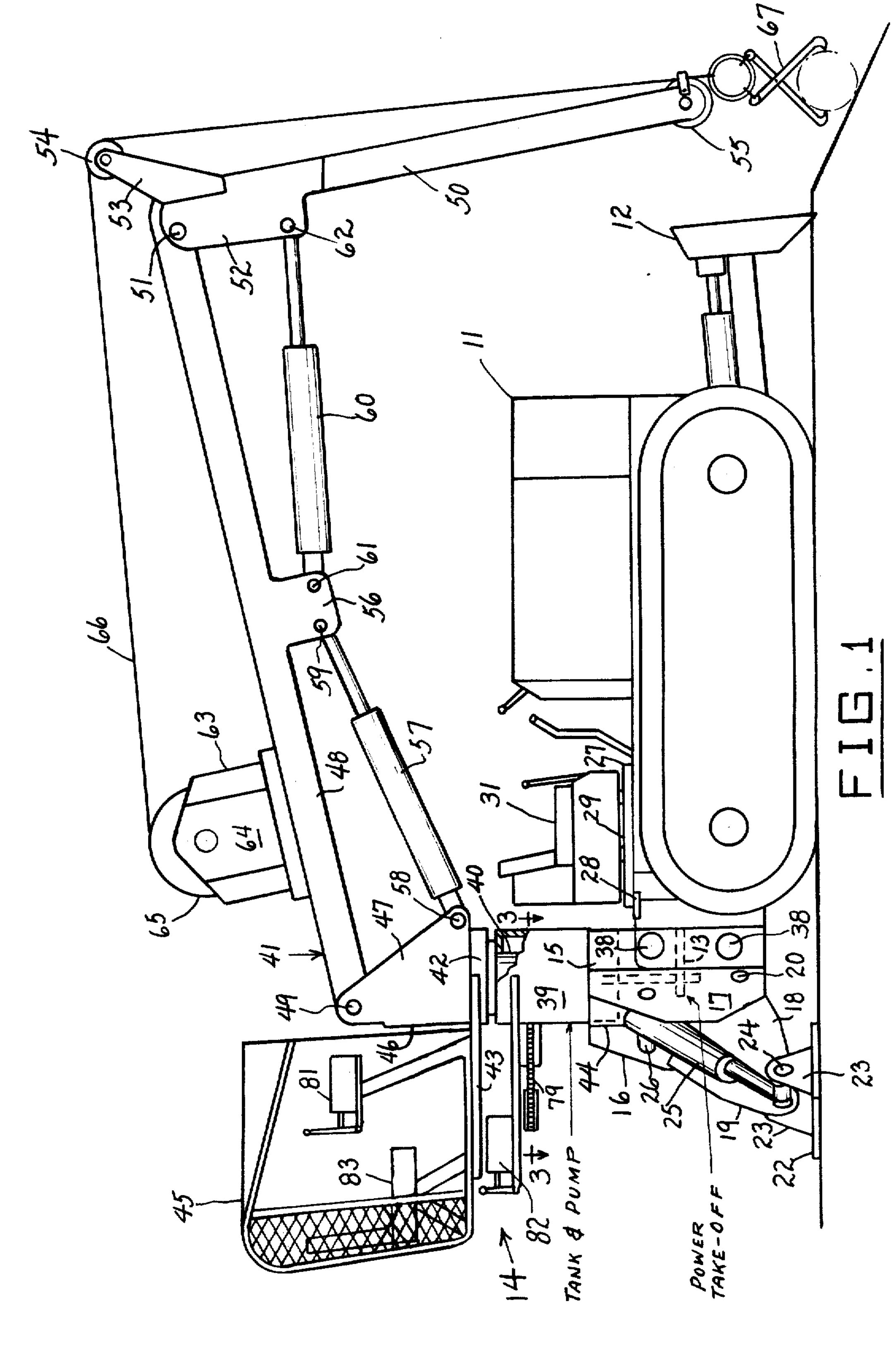
FIG. 1 is a side elevational view of a bulldozer vehicle provided with an improved rotating-boom logging attachment constructed in accordance with the present invention.
Figure 2:
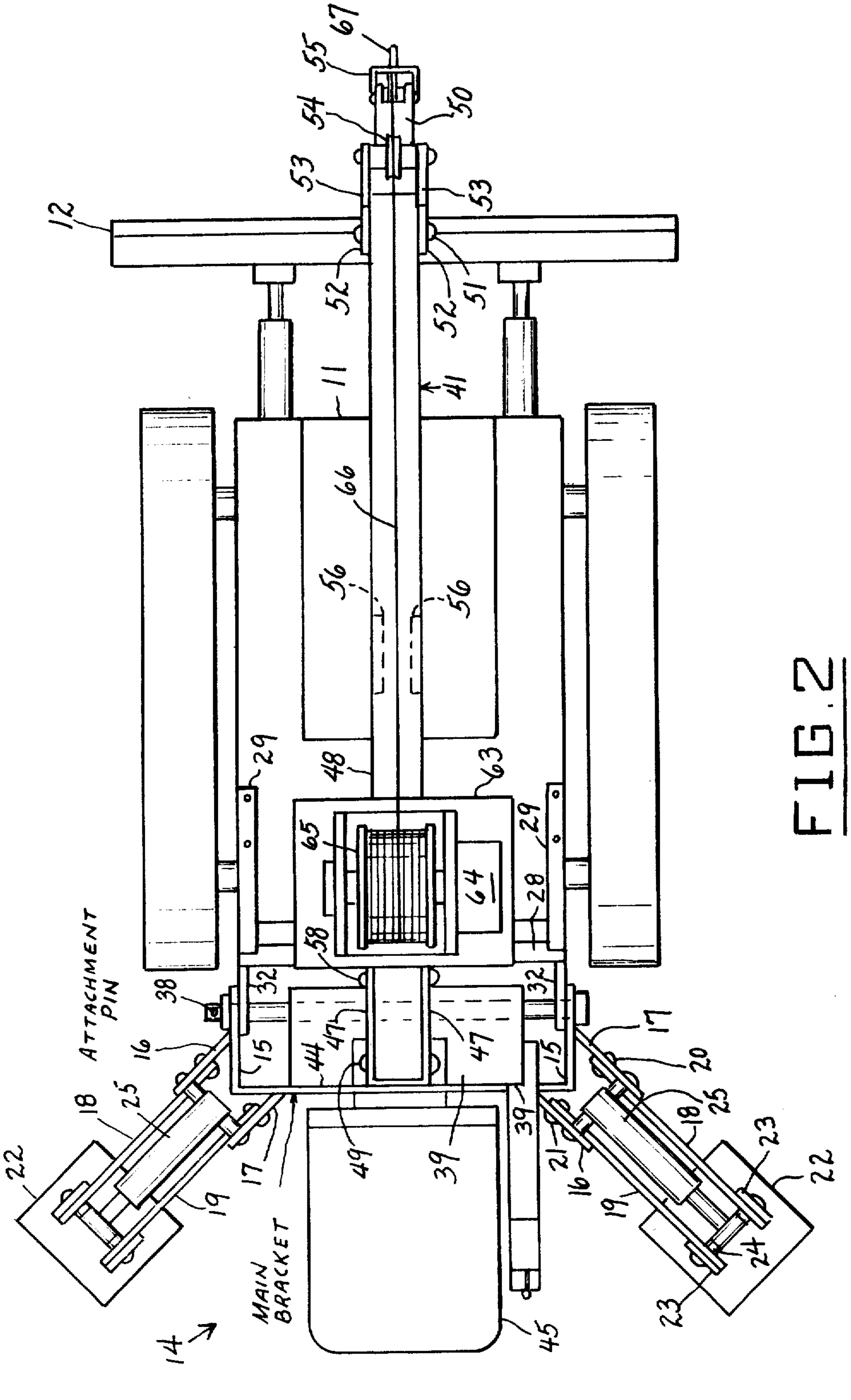
FIG. 2 is a top plan view of the vehicle and logging attachment shown in FIG. 1.

Referring to the drawings, 11 designates a conventional bulldozer tractor vehicle, for example, a John Deere Crawler Tractor having a hydraulically controlled bulldozer blade 12 and being provided with a power take-off shaft 13. Generally designated at 14 is a log handling attachment according to the present invention, which is mounted on the back portion of the bulldozer vehicle 11 and which is energized from said power take-off shaft 13.

The log handling attachment 14 has a transversely extending main frame bracket plate 44 with opposite forwardly extending vertical flanges 15, 15, forming right-angled corners. Rigidly secured to the opposite corner portions thus defined are respectively spaced pairs of parallel vertical, rearwardly and outwardly inclined plate members 16, 17 to which are pivotally connected pairs of outrigger link plates 18, 19, the pivotal connections, shown at 20, 21, being at the lower rear portions of the plate members 16, 17. Respective outrigger shoe members 22, 22 have spaced upstanding lugs 23, 23 which are pivotally connected to the pairs of link plates 18, 19 by transverse shafts 24. Outrigger actuating hydraulic cylinder assemblies 25 are connected between shafts 24 and transverse pivot shafts 26 connecting the upper portions of the pairs of plates 16, 17 for at times rotating the shoe members 22 into supportive ground engagement, as will be presently described.

Figure 5:
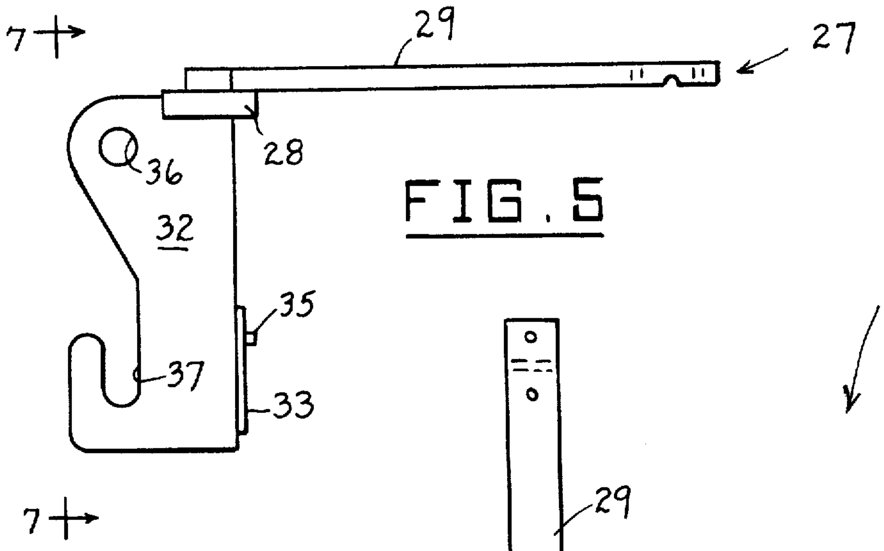
FIG. 5 is an enlarged side elevational view of the vehicle mounting bracket for the logging attachment as employed in FIG. 1.
Figure 6:
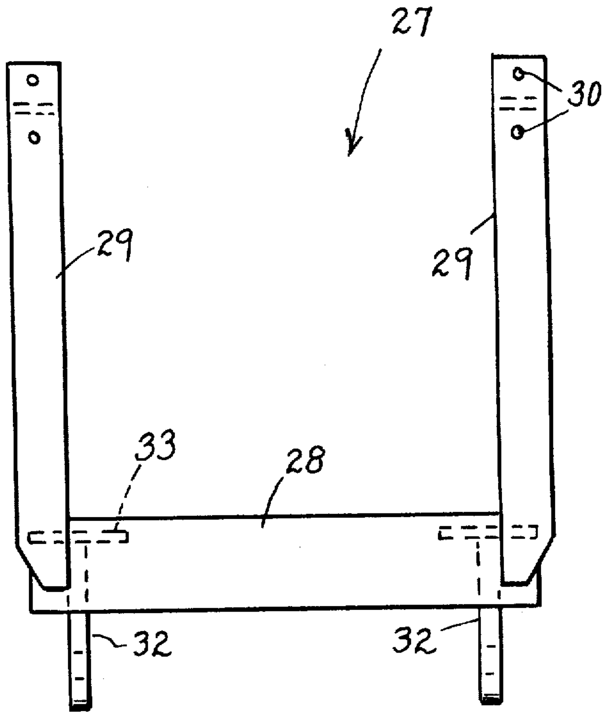
FIG. 6 is a top plan view of the mounting bracket shown in FIG. 5.
Figure 7:
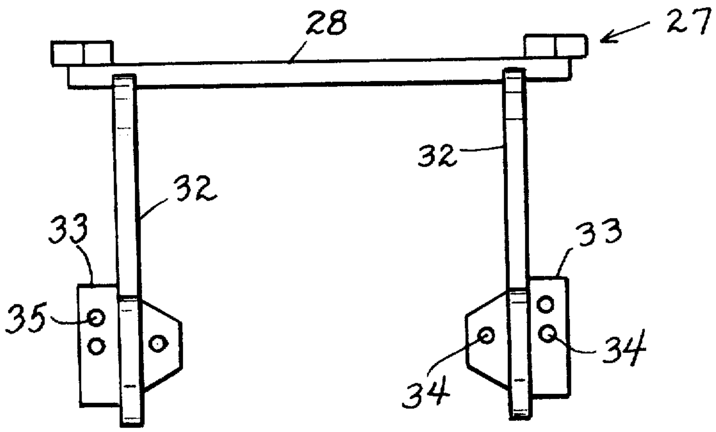
FIG. 7 is an elevational view of the mounting bracket, taken substantially on the line 7—7 of FIG. 5.

A suitable attachment bracket assembly 27, for example as shown in detail in FIGS. 5, 6 and 7, may be employed to connect the main frame member 44 to the rear portion of the frame of the tractor vehicle 11. The bracket assembly 27 comprises a horizontal cross plate 28 to the opposite ends of which are rigidly connected a pair of longitudinal flat bars 29, 29 whose forward ends are apertured at 30, 30 to receive securing bolts for rigidly fastening said flat bars 29 to the frame of the vehicle 11 on opposite sides of the driver's seat 31. Rigidly secured to the opposite end portions of cross plate 28 are respective parallel depending vertical plate members 32, 32. Rigidly secured to the lower forward edge portions of members 32, 32 are respective transversely aligned bracket plates 33, 33 suitably apertured at 34, 34 to receive additional fastening bolts for further securement of the bracket assembly 27 to the rear end of the frame of the tractor vehicle 11. Plates 33 may be provided with forwardly projecting alignment pins 35.

The vertical depending parallel plate members 32, 32 are provided at their upper ends with connection apertures 36 and at their lower portions with vertical slots 37, vertically aligned with apertures 36. The apertures 36 and slots 37 are registrable with corresponding apertures provided in flanges 15, 15 for receiving transverse attachment pins or bolts 38, 38 for supportingly connecting the frame bracket plate 44 to the tractor-mounted bracket assembly 27.

Rigidly secured to the midportion of the transverse main frame member 44 and extending upwardly therefrom is a housing 39 containing a hydraulic pump and reservoir, said pump being provided with suitable coupling means for drivingly connecting it to the vehicle power take-off shaft 13. Journalled in the top end of housing 39 is the vertical pivot shaft 40 of a knuckle boom assembly, designated generally at 41.

Boom assembly 41 comprises a main support 42 to which is rigidly secured a rearwardly extending horizontal platform 43 on which is mounted the operator's cap 45. A vertical channel-shaped bracket member 46 is rigidly secured to member 42 and has generally triangular side flanges 47, 47. A main boom element 48 is pivotally connected at 49 between the top corner portions of side flanges 47, 47. An outer boom element 50 is provided with side plates 52, 52 between which the outer end of main boom element 48 is connected at 51. Parallel supporting lugs 53, 53 project outwardly and upwardly from the side plates 52, 52, and a cable guide pulley 54 is journalled between the top ends of said lugs 53, 53. An end guide pulley 55 is journalled to the free end of outer boom element 50.

The intermediate portion of main boom element 48 is provided with a pair of parallel depending lugs 56, 56. A hydraulic cylinder assembly 57 is connected between the lower corners of the flanges 47, 47 and the lower rear portions of the lugs 56, 56 at pivotal connections shown respectively at 58, 59. Another hydraulic cylinder assembly 60 is connected between the lower forward portions of lugs 56, 56 and the lower corner portions of the side plates 52, 52 at pivotal connections shown respectively at 61, 62. The cylinder assemblies 57 and 60 are employed respectively to adjust the height of the main boom element 48 and the angle between the outer boom element 50 and said main boom element 48.

A hydraulically-driven winch assembly 63 is mounted on the main boom element 48 between the pivotal connection 49 and the lugs 56, and is driven by a reversible hydraulic motor 64. The winch assembly 63 is provided with a cable reel 65 carrying a suitable log-hauling cable 66, for example, up to 1500 feet of $\frac{3}{8}$ inch diameter cable. The winch assembly 63 may be set for a maximum pull of about 8000 pounds. Cable 66 is engaged over guide pulleys 54 and 55, and is provided at its end with a suitable log-engaging tool, such as a pair of tongs 67, as shown in FIG. 1.

Figure 3:
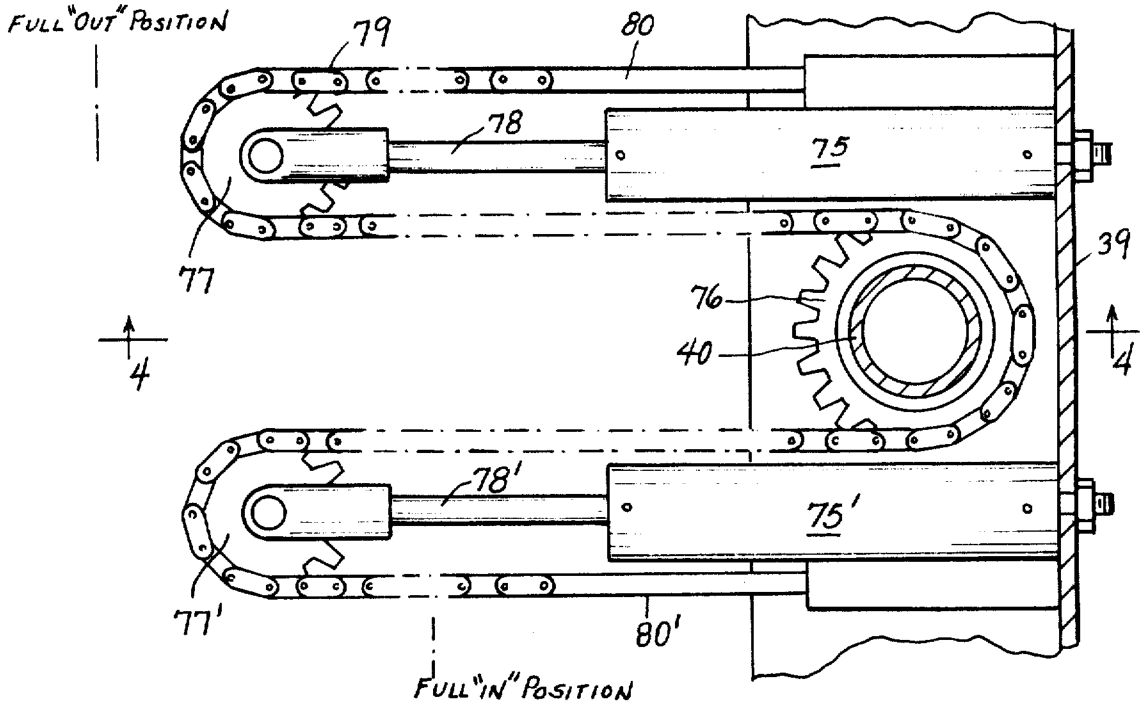
FIG. 3 is an enlarged fragmentary horizontal cross-sectional view taken substantially on the line 3—3 of FIG. 1.
Figure 4:
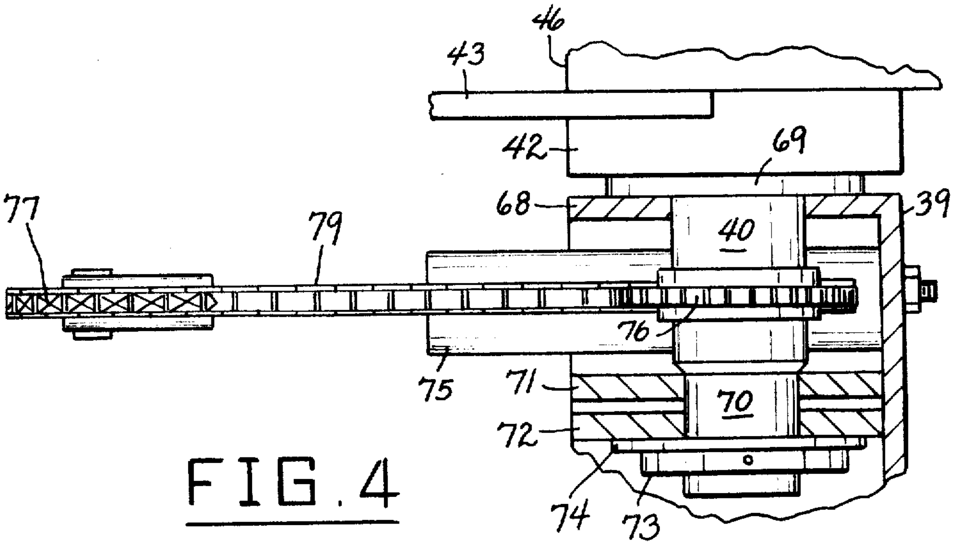
FIG. 4 is a fragmentary vertical cross-sectional view taken substantially on the line 4—4 of FIG. 3.

As shown in FIGS. 3 and 4, boom pivot shaft 40 extends vertically and rotatably through the top wall 68 of housing 39 and is provided with a bearing collar 69 between support block 46 and said top wall 68. Shaft 40 has a reduced lower end portion 70 extending rotatably through spaced horizontal bearing plates 71, 72 rigidly secured in housing 39, and is provided with a bottom retaining collar 73 and with a bearing washer 74 between collar 73 and the lower bearing plate 72.

A pair of hydraulic drive cylinders 75, 75' are horizontally and symmetrically mounted in housing 39 on opposite sides of pivot shaft 40. A boom-rotating sprocket wheel 76 is rigidly secured on shaft 40. Respective sprocket wheels 77, 77' are rotatably mounted on the ends of the piston rods 78, 78' of said hydraulic cylinders. A sprocket chain 79 has its ends connected to respective attachment rods 80, 80' rigidly secured to and extending parallel to the cylinders 75, 75', the sprocket chain meshingly engaging around the sprocket wheels 77, 77' and around the intervening boom-rotating sprocket wheel 76, as shown in FIG. 3. The sprocket chain 79 is arranged to drive the pivot shaft 40 in one direction or the other when one piston rod is extended and the other piston rod is simultaneously retracted. The cylinders 75, 75' are therefore employed to reversibly rotate pivot shaft 40 in one direction or the other by correspondingly controlling the piston movements of the cylinders. For example, hydraulic fluid may be admitted into the right end of cylinder 75 and allowed to exhaust from its left end, while simultaneously, fluid is admitted into the left end of cylinder 75′ and allowed to exhaust from its right end. This will extend piston rod 78 and simultaneously retract piston rod 78′, causing shaft 40 to be rotated counterclockwise, as viewed in FIG. 3. Rotation of the pivot shaft 40 may be reversed by correspondingly reversing the hydraulic fluid admission and exhaust pattern for the driving cylinders 75, 75′. This provides desired horizontal rotation of the boom assembly 41 in either direction, and for a range of at least 360°. By locking the hydraulic fluid in the cylinders 75, 75′, the boom assembly 41 will be locked in a desired rotated position.

The various hydraulic cylinders and the hydraulic winch assembly 63 employed in the log handling attachment 14 are drivingly connected to the hydraulic pump contained in housing 39 via conventional hydraulic circuits including conventional control valves, which are conveniently located. Thus, the cab 45 contains an operator's seat 83 adjacent to an array 81 of control valves for operating the various hydraulic devices associated with the rotating boom assembly 41, including the reversible winch motor 64, the knuckle boom control cylinders 57, 60 and the boom-rotating cylinders 75, 75′. Another control valve assembly 82 is conveniently mounted on the non-rotating portion of the log handling attachment for suitably activating the outrigger operating cylinders 25.

The log handling attachment 14 is suitable for use with a wide range of conventional tractor vehicles. The typical vehicle 11 illustrated herein is similar to the John Deere 450 Crawler. The hydraulic winch 63 is similar to the Gearmatic GH-85 hydraulic winch.

The vehicle 11 carrying the attachment 14 provides a highly mobile means for handling large or small logs, and can be quickly moved from one setting to the next. This mobility makes the machine very useful for harvesting small woodlands and steep slopes.

For sawlog removals and clearcut harvests, the apparatus can be used with tongs 67. In sanitation thinnings, a sliding choker can be used in addition to the tongs.

A typical cycle of operation for the machine begins with a worker hauling the tongs downhill as the machine operator releases cable from the winch drum 65. Due to the controlled drag of the cable, the worker can retain his balance even on relatively steep slopes.

When halfway to the log, the worker passes the tongs to a second worker who continues to the log, which has been suitably trimmed and prepared for removal, and attaches the tongs. The second worker then signals to the machine operator by radio, and the log begins its trip uphill. The logs are thus brought to the landing for suitable further handling. For decking a log after landing, the tongs 67 are connected at the center of gravity of the log, and then the log is lifted and swung into place.

During yarding, the vehicle is placed transverse to the road. Both outrigger shoes 22, 22 and the bulldozer blade 12 are lowered, providing reliable stability and eliminating the need for guylines.

While a specific embodiment of an improved log handling machine has been disclosed in the foregoing description, it will be understood that various modifications within the scope of the invention may occur to those skilled in the art. Therefore it is intended that adaptations and modifications should and are intended to be comprehended within the meaning and range of equivalents of the disclosed embodiment.

What is claimed is:

1. A self-contained log handling attachment for use with a self-propelled vehicle, said vehicle comprising power take-off means, said attachment comprising self-contained hydraulic pump means, means to connect said hydraulic pump means to said vehicle power take-off means, said hydraulic pump means supplying power for substantially all functions of said attachment, said attachment comprising supporting bracket means, means to rigidly secure said supporting bracket means to the rear portion of the vehicle, whereby the rest of said attachment is readily mounted and dismounted on and off said supporting bracket means on said vehicle without affecting said vehicle's normal operating abilities, upstanding boom support means vertically journalled on said supporting bracket means, means to adjustably rotate said boom support means relative to said supporting bracket means to selected angular positions covering a full 360° circle of said attachment about a substantially vertical axis of rotation of said support relative to said supporting bracket means, an articulated boom assembly pivotally connected to the upper portion of said upstanding boom support means, an operator's cab mounted on said attachment for rotation together with said articulated boom assembly, said supporting bracket means providing a substantially rigid connection of said log handling attachment to said vehicle such that said log handling attachment can operate in all positions in said 360° circle of rotation; and said rigid connection and the weight of said vehicle adding together and acting to increase the load handling capability of said log handling attachment when said log handling attachment is substantially axially aligned and overhead with respect to said vehicle; means in said cab for controlling all functions of said attachment, winch means mounted on said articulated boom assembly adjacent said upstanding boom support means, cable guide means on said articulated boom assembly, said cable guide means comprising a cable guide pulley rotatably mounted at a hinge portion of said articulated boom assembly, said winch means having a cable engaged over said cable guide pulley, log-engaging tool means connected at the end of said cable, and said cable guide means further comprising a shielded end guide pulley at the end of said articulated boom assembly.

2. The log handling machine of claim 1, and wherein said articulated boom assembly comprises a first elongated boom element pivoted to the upper portion of said upstanding boom support means, a first hydraulic cylinder assembly connected between the first boom element and the upstanding boom support means, a second elongated boom element pivotally connected to the outer end of said first boom element, and a second hydraulic cylinder assembly connected between the first boom element and the second boom element.

3. The log handling machine of claim 2, and wherein said first hydraulic cylinder assembly is connected between the intermediate portion of the first boom element and the lower portion of the upstanding boom support means.

4. The log handling machine of claim 2, and wherein said first boom element is provided at its intermediate portion with depending lug means, and wherein said first hydraulic cylinder assembly is connected between the lower portion of said depending lug means and the lower portion of said upstanding boom support means.

5. The log handling machine of claim 4, and wherein said second hydraulic cylinder assembly is connected between said depending lug means and the second boom element.

6. The log handling machine of claim 5, and wherein said second boom element is provided adjacent to its connection with the first boom element with connection side plate means, and wherein said second hydraulic cylinder assembly is connected between said depending lug means and said connection side plate means.

7. The log handling machine of claim 5, and wherein said winch means is mounted on the first boom element at a location between its pivotal connection to the upper portion of the upstanding boom support means and said depending lug means.

8. The log handling machine of claim 1, and wherein said upstanding boom support means has depending vertical shaft means journalled in said supporting bracket means, and wherein the means to adjustably rotate said boom support means comprises hydraulic drive means operatively connected between said supporting bracket means and said depending vertical shaft means.

9. The log handling machine of claim 8, and wherein said hydraulic drive means comprises hydraulic cylinder means mounted on said supporting bracket means, and means gearingly coupling said hydraulic cylinder means to said vertical shaft means.

10. The log handling machine of claim 8, and wherein said hydraulic drive means comprises a pair of hydraulic cylinders mounted on said supporting bracket means on opposite sides of said vertical shaft means, said cylinders having respective reciprocatory piston rods, and means to rotate said vertical shaft means responsive to opposite reciprocating movement of said piston rods.

11. The log handling machine of claim 8, and wherein said hydraulic drive means comprises respective hydraulic cylinders secured to the supporting bracket means on opposite sides of the vertical shaft means, said cylinders having reciprocatory piston rods, respective sprocket wheels journalled on the ends of the piston rods, a driven sprocket wheel rigidly mounted on said vertical shaft means, and a sprocket chain connected at its ends to said supporting bracket means and meshingly engaged around said piston rod sprocket wheels and said driven sprocket wheel so as to rotate said vertical shaft means responsive to opposite reciprocating movement of said piston rods.

12. The log handling machine of claim 1, and outwardly and laterally extending ground-engaging outrigger shoe means pivoted to opposite side portions of said supporting bracket means, and hydraulic cylinder shoe-extending means operatively connected between said outrigger shoe means and said supporting bracket means for at times extending the shoe means into ground engagement.

* * * * *